US 9,690,641 B2

(12) United States Patent
Ozawa et al.

(10) Patent No.: US 9,690,641 B2
(45) Date of Patent: Jun. 27, 2017

(54) CLEARING A WATCHDOG TIMER EVERY TIME A PROCESSOR INSTRUCTS A TRANSMISSION OF A PING MESSAGE TO A POWER RECEIVING DEVICE

(71) Applicant: ROHM CO., LTD., Ukyo-ku, Kyoto (JP)

(72) Inventors: Kazumasa Ozawa, Kyoto (JP); Takashi Sato, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 3 days.

(21) Appl. No.: 14/813,679

(22) Filed: Jul. 30, 2015

(65) Prior Publication Data
US 2016/0034333 A1    Feb. 4, 2016

(30) Foreign Application Priority Data

Aug. 1, 2014    (JP) ................................. 2014-157519

(51) Int. Cl.
| | |
|---|---|
| *G06F 1/00* | (2006.01) |
| *G06F 11/00* | (2006.01) |
| *G04F 10/04* | (2006.01) |
| *G06F 11/07* | (2006.01) |
| *G06F 1/26* | (2006.01) |

(52) U.S. Cl.
CPC ............ *G06F 11/0757* (2013.01); *G06F 1/26* (2013.01); *G06F 11/0721* (2013.01)

(58) Field of Classification Search
CPC .................................................. G06F 1/3203
USPC ...................................................... 713/300
See application file for complete search history.

(56) References Cited

U.S. PATENT DOCUMENTS

| 5,233,613 A * | 8/1993 | Allen ................... G06F 11/0757 714/23 |
| 5,257,373 A * | 10/1993 | Kurihara ................. F02D 41/22 714/E11.004 |
| 6,385,274 B1 * | 5/2002 | Nohara ............... G06F 11/0757 377/16 |
| 8,447,965 B2 * | 5/2013 | Minagawa ................ G06F 1/24 713/1 |

(Continued)

FOREIGN PATENT DOCUMENTS

| JP | 2006060977 A | 3/2006 |
| JP | 2006304500 A | 11/2006 |
| JP | 2013198262 A | 9/2013 |

*Primary Examiner* — Suresh Suryawanshi
(74) *Attorney, Agent, or Firm* — Cantor Colburn LLP

(57) ABSTRACT

A controller, which is installed on a power supply device complying with the USB (Universal Serial Bus)-PD (power delivery) specification and controls a power supply circuit for supplying a bus voltage to a power receiving device via a bus line is disclosed. The controller includes an interface circuit, which communicates with the power supply device via the bus line; a processor, which transmits and receives messages to and from the power receiving device by using the interface circuit, determines a voltage level of the bus voltage, and sets the determined voltage level to the power supply circuit; and a watchdog timer, which is cleared whenever the processor executes a ping-related command for transmission or reception of ping messages to or from the power receiving device, wherein an overflow period of the watchdog timer is set to be longer than a period for the ping messages.

13 Claims, 8 Drawing Sheets

(56) References Cited

U.S. PATENT DOCUMENTS

| | | | | |
|---|---|---|---|---|
| 2006/0053349 A1* | 3/2006 | Ozawa | ............... | G06F 11/0757 |
| | | | | 714/55 |
| 2008/0184341 A1* | 7/2008 | Sebesta | ............... | H04L 63/0807 |
| | | | | 726/4 |
| 2014/0208134 A1* | 7/2014 | Waters | ................... | G06F 1/266 |
| | | | | 713/310 |

* cited by examiner

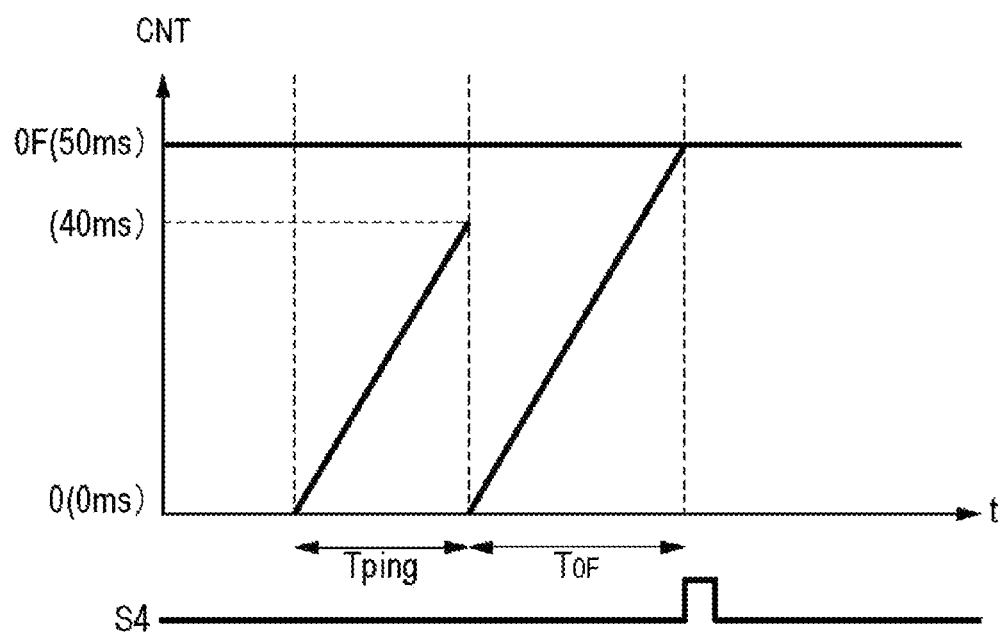

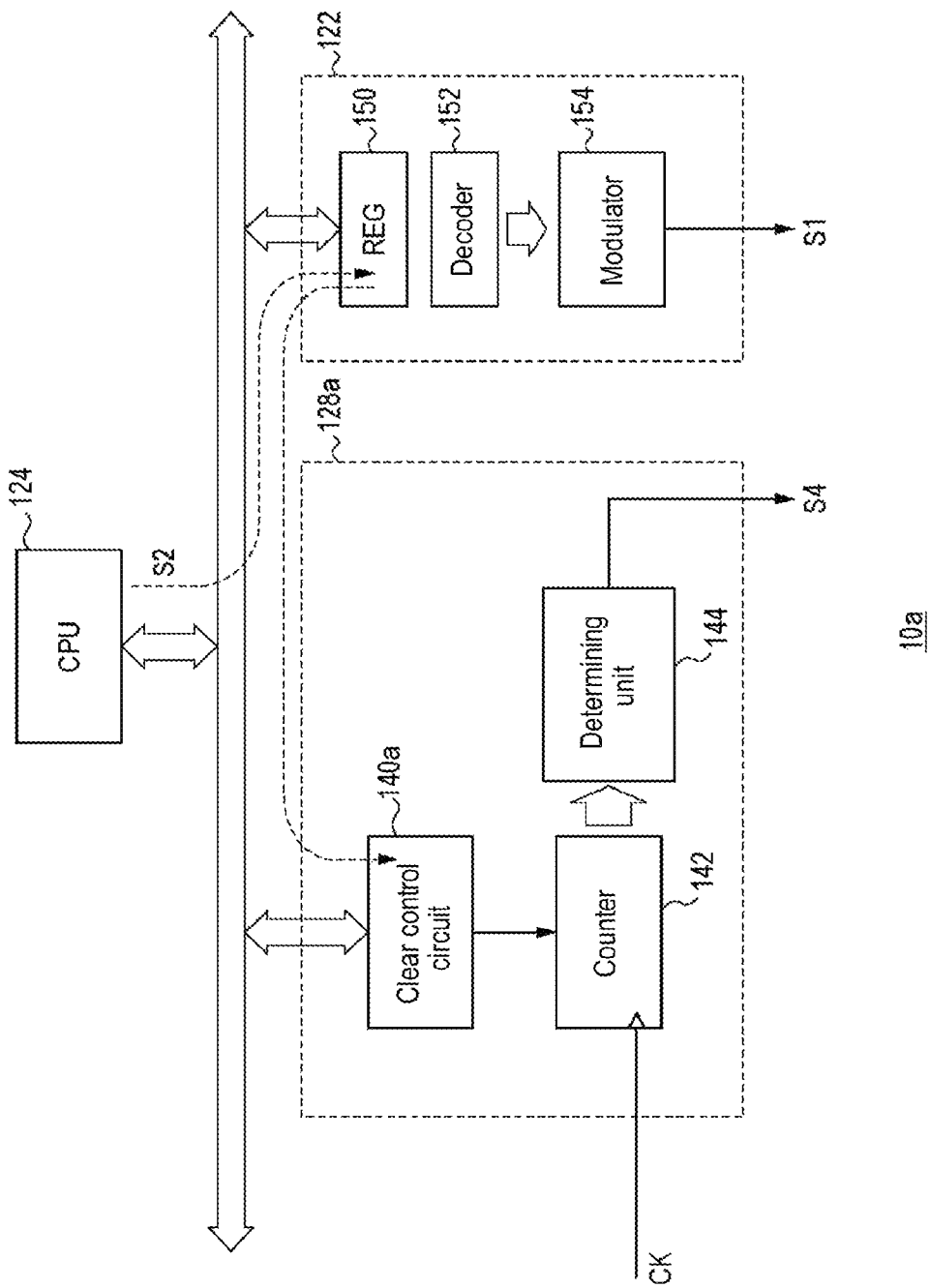

US 9,690,641 B2

CLEARING A WATCHDOG TIMER EVERY TIME A PROCESSOR INSTRUCTS A TRANSMISSION OF A PING MESSAGE TO A POWER RECEIVING DEVICE

CROSS-REFERENCE TO RELATED APPLICATION

The present invention claims priority under 35 U.S.C. §119 to Japanese Application No. 2014-157519, filed on Aug. 1, 2014, the entire content of which is incorporated herein by reference.

TECHNICAL FIELD

The present disclosure relates to a USB (Universal Serial Bus) power supply device.

BACKGROUND

A battery-driven device, such as a smart phone, a mobile phone, a tablet PC (Personal Computer), a laptop PC, and a portable audio player, may include a rechargeable secondary battery and a charging circuit for charging the battery. From among various charging circuits, there is a charging circuit that charges a secondary battery based on a DC bus voltage supplied from a USB host adapter via a USB cable.

Currently, charging circuits included in mobile devices comply with the USB Battery Charging Specification (hereinafter referred to as BC specification) standard. Several types of host adapters are currently available. The BC revision 1.2 specification defines types of chargers including a SDP (Standard Downstream Port), a DCP (Dedicated Charging Port), and a CDP (Charging Downstream Port). Furthermore, currents (current capacities) that can be supplied by host adapters are defined according to types of chargers. Specifically, a current of 1500 mA is defined for the DCP and the CDP, while currents of 100 mA, 500 mA, and 900 mA are defined for the SDP according to versions of USB.

As a next-generation method and system for charging a secondary battery using USB, a specification called as USB Power Delivery (hereinafter referred to as PD specification) has been introduced. In the PD specification, a suppliable power is significantly increased to a maximum of 100 W from 7.5 W of the BC specification. Specifically, in the PD specification, a voltage higher than 5V (e.g. 12V or 20V) is allowed to be supplied as a USB bus voltage, and a supply of a charging current (e.g., 2 A, 3 A, and 5 A) greater than that in the BC specification is also allowed.

A power supply circuit that generates a bus voltage and a USB-PD controller that communicates with a power receiving device via a bus line are included in a power supply device compliant with a USB-PD specification. A USB-PD controller communicates with a power receiving device and controls a power supply circuit by negotiating a voltage level of a bus voltage. A control sequence of such a USB-PD controller is managed by a processor that executes programs.

To monitor congestion of a processor and reset a system in case of a malfunction, a watchdog timer (WDT) is used. A program executed by a processor is written to reset the WDT in a predetermined reset cycle, e.g., once every a few seconds. An overflow cycle of the WDT is set to be longer than a reset cycle of the WDT.

While a processor normally operates, a WDT is reset in a predetermined reset cycle before the WDT overflows. Meanwhile, if congestion occurs at a processor due to any type of malfunction, the WDT is not reset but overflows, and thus the malfunction may be detected.

A system becomes out of control for a few seconds from the malfunction of a processor until the WDT detects the malfunction of the processor. If a system goes out of control in a power supply device, a high voltage exceeding a breakdown voltage of a power receiving device may be output for a few seconds and may cause adverse effects to the reliability of the power receiving device or the power supply device itself.

SUMMARY

In view of the above, an embodiment of the present disclosure includes a USB-PD controller capable of detecting a malfunction of a processor in a short time.

According to one embodiment of the present disclosure, provided is a controller, which is installed on a power supply device complying with the USB (Universal Serial Bus)-PD (power delivery) specification and controls a power supply circuit for supplying a bus voltage to a power receiving device via a bus line. The controller includes an interface circuit, which communicates with the power supply device via the bus line; a processor, which transmits and receives messages to and from the power receiving device by using the interface circuit, determines a voltage level of the bus voltage, and sets the determined voltage level to the power supply circuit; and a watchdog timer, which is cleared whenever the processor executes a ping-related command for transmission or reception of ping messages to or from the power receiving device, wherein an overflow period of the watchdog timer is set to be longer than a period for the ping messages.

In the USB-PD specification, a ping message is generated every 40 ms to identify the existence of a connected power receiving device. Since software processing of a processor intervenes transmissions of the ping messages, an anomaly of the processor may be detected at a short period of time by resetting a watchdog timer concurrently with the corresponding software processing. Thus, output of a high voltage or a high current for a long time period of a few seconds as in the conventional art can be prevented, thereby improving reliability of the system.

As used herein, the "USB-PD specification" is not limited to the current version thereof and includes further enhancements thereof, next-generation specifications derived therefrom, etc.

The processor may transmit a clear command to the watchdog timer every time the processor instructs a transmission of a ping message to the interface circuit.

In this case, a ping-related statement related to transmission of ping messages and a statement for transmitting a clear command may be added to the program executed by the processor, and thus an increase of hardware resources may be suppressed.

The watchdog timer may include a counter; a determining unit, which compares a counted value of the counter to a predetermined threshold value; and a clear control circuit, which receives the clear command generated by the processor and, resets the counter if the clear command is received.

A program executed by the processor may include a first statement for instructing a transmission of the ping messages to the interface circuit; and a second statement for generating a clear command for the watchdog timer.

The watchdog timer may monitor control data related to a command for transmitting a ping message, which is transmitted from the processor to the interface circuit, and may be cleared if the control data satisfies a predetermined condition.

In this case, the number of processes performed by the processor may be equivalent to that in the conventional art, and thus an increase in software load may be suppressed.

The watchdog timer may include a counter; a determining unit, which compares a counted value of the counter to a designated threshold value; and a clear control circuit, which resets the counter if the processor monitors the control data transmitted to the interface circuit and the control data satisfies a predetermined condition.

The processor may transmit a clear command to the watchdog timer at a predetermined period if the power receiving device does not comply with the USB-PD specification.

The controller may be monolithically integrated on a single semiconductor substrate.

The term "monolithic integration" may be applied to a case in which all circuit components are formed on a semiconductor substrate and a case in which major circuit components are monolithically integrated, where some resistors or capacitors may be arranged outside a semiconductor substrate to allow a circuit to be constantly adjusted.

By integrating a circuit as a single IC, a circuit area may be reduced and properties of circuit elements may be uniformly maintained.

According to another embodiment of the present disclosure, provided is a power supply device including a power supply circuit, which is capable of outputting a first bus voltage with a first voltage level and a second bus voltage with a second voltage level higher than the first voltage level; a first switch, which is arranged on a path of the first bus voltage; a second switch, which is arranged on a path of the second bus voltage; and any of the above-stated controllers, which controls the power supply circuit, the first switch, and the second switch.

According to another embodiment of the present disclosure, provided is an electronic device including the above-stated power supply device.

Furthermore, arbitrary combinations of the constituent elements and conversions of the expression of the present disclosure between methods, devices, and systems are also effective as aspects of the present disclosure.

BRIEF DESCRIPTION OF THE DRAWINGS

FIGS. 5A and 5B are operation waveform diagrams of the power supply device in FIG. 2.

FIG. 6 is a block diagram of a power supply device according to a second embodiment of the present disclosure.

DETAILED DESCRIPTION

Figure 1:
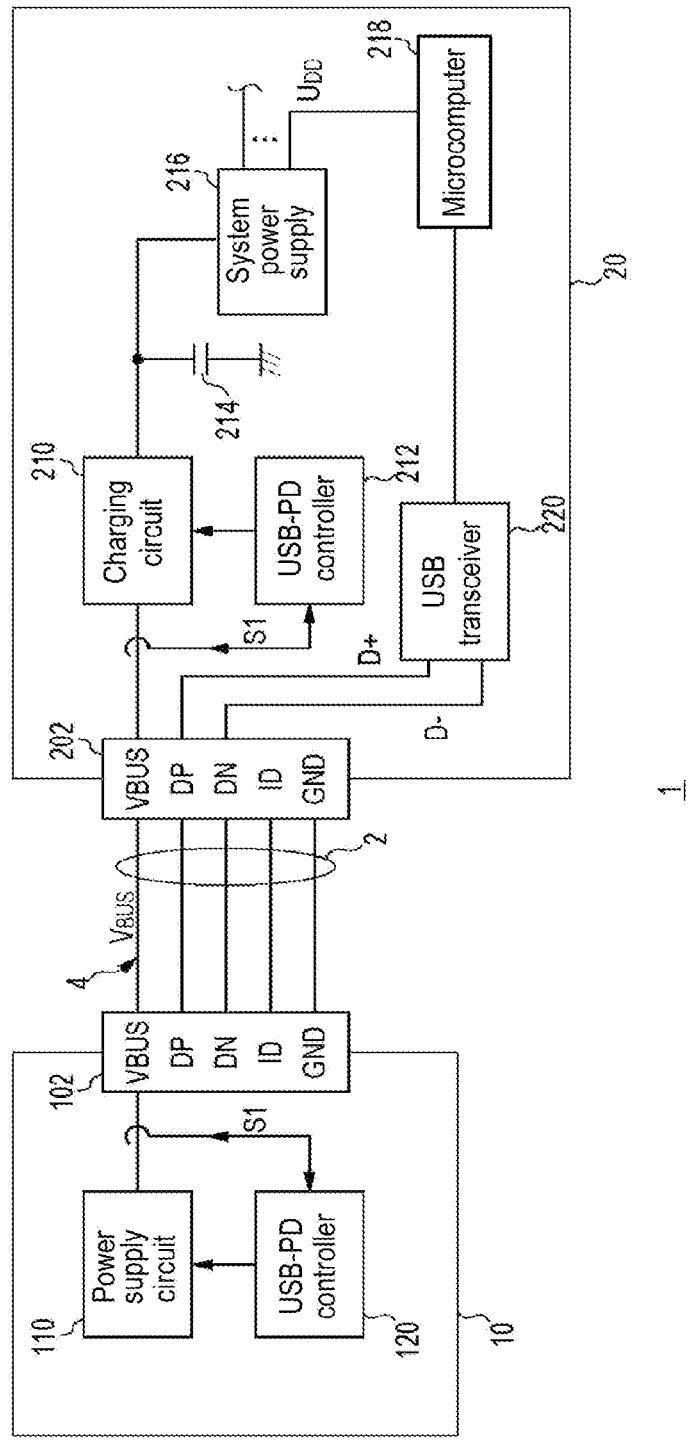
FIG. 1 is a block diagram showing a power supply system including a power supply device according to one embodiment of the present disclosure.

Various embodiments of the present disclosure will be described below in detail with reference to the accompanying drawings. Throughout the drawings, the same or similar elements, members, and processes are denoted by the same reference numerals and redundant descriptions thereof may be omitted. The disclosed embodiments are not limited to the present disclosure, and are provided for the purpose of illustration, and all features and combinations thereof described in the embodiments should not be necessarily construed as describing the gist of the present disclosure.

As used herein, the expression "a member A is connected with a member B" may mean that member A is physically and directly connected to member B, or that member A is connected to member B via another member without substantially affect the electrical connection or without harming the functionality or effects that may be achieved by the connection.

Similarly, the expression "a member C is interposed between a member A and a member B" may indicate that the member A is directly connected to the member C or the member B is directly connected to the member C, and that the members are indirectly connected via another member without substantially affect the electrical connection or without harming the functionality or effects that may be achieved by the connections.

FIG. 1 is a block diagram showing a power supply system 1 including a power supply device 10 according to one embodiment of the present disclosure. The power supply system 1 includes the power supply device 10, and a power receiving device 20.

The power supply device 10 and the power receiving device 20 comply with the USB-PD specification. The power receiving device 20 is included in a battery-driven information terminal device, for example, such as a mobile phone terminal, a tablet terminal, a laptop PC (personal computer), a digital camera, a digital video camera, etc.

The power receiving device 20 includes a USB port 202, a charging circuit 210, a USB-PD controller 212, a secondary battery 214, a system power supply 216, a microcomputer 218, and a USB transceiver 220.

The secondary battery 214 is a secondary battery including a lithium-ion battery or a nickel metal hydride battery, and outputs a battery voltage $V_{BAT}$. The number of cells of the secondary battery 214 may vary according to the type of the power receiving device 20. If the secondary battery 214 includes one cell, a battery voltage $V_{BAT}$ is about 4.5V. If the secondary battery 214 includes two cells, the battery voltage $V_{BAT}$ is about 9V. Therefore, when being connected to the power receiving device 20 including the secondary battery 214 of one cell, the power supply device 10 may supply a bus voltage $V_{BUS}$ of 5V. However, it is necessary for the power supply device 10 to supply a bus voltage $V_{BUS}$ of 12V or 20V to the power receiving device 20 including the secondary battery 214 of two or more cells.

The power supply device 10, which is a universal serial bus (USB) host adapter, may be attachable to and detachable from the USB port 202 of the power receiving device 20 via a USB cable 2.

In one embodiment, a direct current (DC) voltage (also referred to as a bus voltage or a bus power) $V_{BUS}$ from the power supply device 10 is supplied to a VBUS terminal of the USB port 202 via a bus line 4. A DP terminal and a DM terminal are connected to data lines D+ and D− of a USB cable. An ID terminal is not employed in this embodiment. A GND terminal is connected to a GND line.

The charging circuit 210 receives the bus voltage $V_{BUS}$ and charges the secondary battery 214. In the PD specification, a communication protocol between the power supply device 10 and the power receiving device 20 is defined, and thus data or information may be transmitted and received via the bus line 4. The communication is performed by overlapping a modulated signal S1 onto the bus voltage $V_{BUS}$ of the bus line 4. The USB-PD controller 212 includes a communication unit for communicating with the power supply device 10 via the bus line 4.

The microcomputer 218 is a host processor for controlling the entire power receiving device 20. In the case of a wireless communication terminal, a baseband processor or an application processor corresponds to the microcomputer 218.

The system power supply 216 steps up or down a battery voltage $V_{BAT}$, thereby generating a plurality of power supply voltages for respective blocks of the power receiving device 20. A power supply voltage VDD generated by the system power supply 216 is supplied to the microcomputer 218.

The USB transceiver 220 transmits and receives data to and from the power supply device 10 via the data lines D+ and D−.

The above-described configuration is a configuration of the power receiving device 20. Furthermore, the power supply device 10 that supplies a bus voltage $V_{BUS}$ to the power receiving device 20 will be described below.

The power supply device 10 includes a USB port 102, a power supply circuit 110, and a USB-PD controller 120. A USB cable 2 is connected to the USB port 102. The power supply circuit 110 is a variable voltage source, generates a bus voltage $V_{BUS}$ of 5V or bus voltages $V_{BUS}$ from 12V to 20V, and supplies the generated bus voltage $V_{BUS}$ to the power receiving device 20 via the bus line 4.

The USB-PD controller 120 controls the power supply circuit 110. In one embodiment, the USB-PD controller 120 communicates with the USB-PD controller 212 of the power receiving device 20 via the bus line 4 by using a modulated signal S1 overlapped on a bus voltage $V_{BUS}$, and conducts negotiation about a voltage level of a bus voltage $V_{BUS}$ to be supplied to the power receiving device 20. Furthermore, the USB-PD controller 120 notifies the USB-PD controller 212 of a current that can be supplied by the power supply device 10, and the USB-PD controller 212 determine a charging current of the charging circuit 210.

The description given above is a brief description of the power supply system 1. Next, detailed description of the power supply device 10 according to some embodiments of the present disclosure will be given below.

Figure 2:
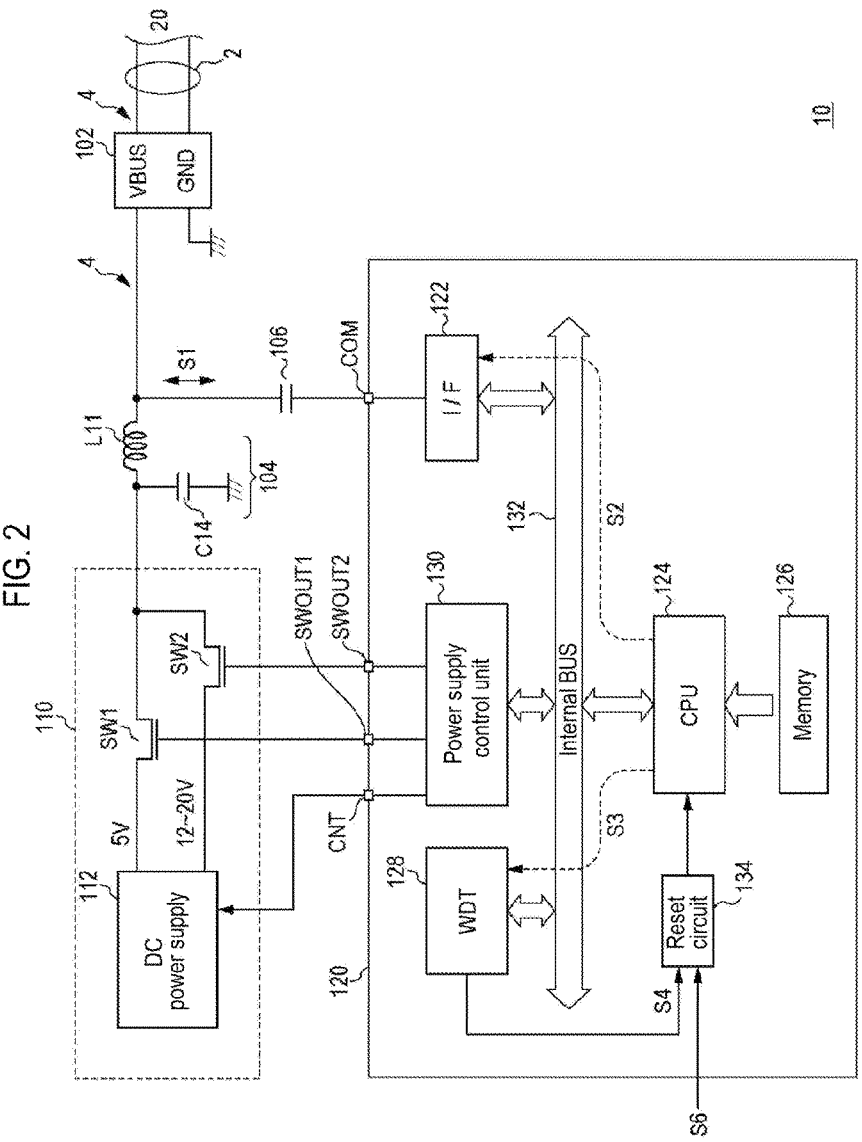
FIG. 2 is a block diagram showing a power supply device according to a first embodiment of the present disclosure.

FIG. 2 is a block diagram showing the power supply device 10 according to a first embodiment of the present disclosure. The power supply device 10 includes a power supply circuit 110, a USB-PD controller 120, a filter 104, and a coupling capacitor 106.

The power supply circuit 110 includes a DC power supply 112, a first switch SW1, and a second switch SW2. The power supply circuit 110 is configured to be able to output a first bus voltage $V_{BUS1}$ with a first voltage level (e.g., 5V) and a second bus voltage $V_{BUS2}$ with a second voltage level higher than the first voltage level (e.g., from 12V to 20V). The first switch SW1 is arranged on a path of the first bus voltage $V_{BUS1}$, while the second switch SW2 is arranged on a path of the second bus voltage $V_{BUS2}$. The first bus voltage $V_{BUS1}$ is output to the bus line 4 when the first switch SW1 is ON, while the second bus voltage $V_{BUS2}$ is output to the bus line 4 when the second switch SW2 is ON. The power supply circuit 110 may consist of a linear regulator, a charge pump circuit, a DC/DC converter, etc. However, configuration of the power supply circuit 110 is not limited thereto.

The filter 104 is arranged between the power supply circuit 110 and the bus line 4. The filter 104 prevents a modulated signal S1, which is used for a communication via the bus line 4, from being introduced to the power supply circuit 110 as noise. The filter 104 includes a capacitor C11, which is arranged between the bus line 4 and the ground, and an inductor L11, which is arranged in series to the bus line 4.

The USB-PD controller 120 controls ON/OFF states of the first switch SW1 and the second switch SW2 of the power supply circuit 110 and an output voltage of the DC power supply 112 based on a result of negotiation via the bus line 4.

The USB-PD controller 120 includes an interface circuit 122, a processor (CPU) 124, a memory 126, a watchdog timer 128, a power supply control unit 130, an internal bus 132, and a reset circuit 134, and is a functional integrated circuit (IC) that is integrated on a single semiconductor chip.

The USB-PD controller 120 includes a communication (COM) terminal, a switch output (SWOUT1) terminal, a switch output (SWOUT2) terminal, and a control (CNT) terminal. The COM terminal is connected to the bus line 4 via the coupling capacitor 106, a modulated signal S1 can be input to or output via the COM terminal. The SWOUT1 terminal and the SWOUT2 terminal are connected to gates of the first switch SW1 and the second switch SW2, respectively. The CNT terminal is connected to the DC power supply 112.

The interface circuit 122 communicates by transmitting and receiving a modulated signal S1 to and from the power receiving device 20 via the bus line 4. Data received by the interface circuit 122 from the power receiving device 20 may be input to the processor 124 via the internal bus 132. Furthermore, the interface circuit 122 may also receive data output by the processor 124 via the internal bus 132, modulate the received data, and output the modulated data to the power receiving device 20 as a modulated signal S1.

Programs including processes to be performed by the processor 124 are stored in the memory 126, and the processor 124 performs various processes based on the programs. In one embodiment, the processor 124 transmits and receives messages to and from the power receiving device 20 by using the interface circuit 122 and is also configured to be able to control the watchdog timer 128, the power supply control unit 130, the interface circuit 122, etc.

The processor 124 determines a voltage level of a bus voltage $V_{BUS}$ based on a result of negotiation with the power receiving device 20 using messages. In addition, the processor 124 sets a determined voltage level to the power supply circuit 110. The power supply control unit 130 receives data related to the voltage level determined by the processor 124 via the internal bus 132 and, based on the data, changes ON/OFF states of the first switch SW1 and the second switch SW2 and sets an output voltage of the interface circuit 122.

Furthermore, to determine whether there is a connection of the power receiving device 20, the processor 124 transmits a ping message to the interface circuit 122 at a designated period $T_{ping}$ (40 ms).

The watchdog timer 128 is cleared whenever the processor 124 executes a ping-related statement for transmission/reception of ping messages to/from the power receiving device 20. An overflow period $T_{OF}$ of the watchdog timer 128 is set to be longer than the period $T_{ping}$ of ping messages. For example, an overflow period $T_{OF}$ may be about 50 ms. If the watchdog timer 128 is not cleared and an overflow period $T_{OF}$ elapses, the watchdog timer 128 asserts a reset signal S4 (e.g., high level).

When the reset signal S4 is asserted or a reset signal S6 from outside is asserted, the reset circuit 134 resets the processor 124 and operates the power supply device 10 again.

According to this embodiment, the processor 124 is configured to transmit a clear command S3 to the watchdog timer 128 whenever the processor 124 instructs the interface circuit 122 to transmit a ping message.

Figure 3:
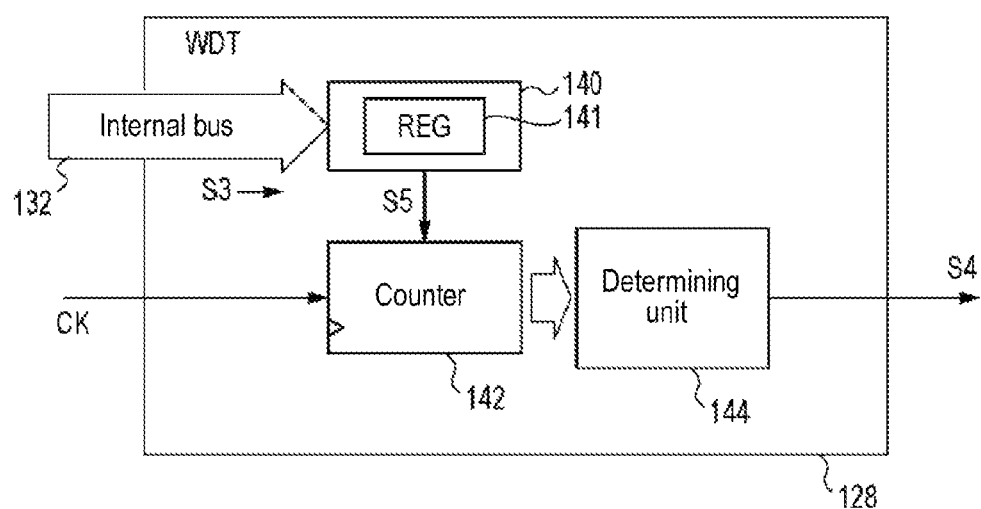
FIG. 3 is a block diagram showing an exemplary configuration of a watchdog timer.

FIG. 3 is a block diagram showing an exemplary configuration of the watchdog timer 128. The watchdog timer 128 includes a clear control circuit 140, a counter 142, and a determining unit 144. The clear control circuit 140 includes a register 141 that is capable of being written by the processor 124. The processor 124 sets up a clear flag by writing a predetermined value to the register 141 and transmits a clear command S3.

The counter 142 counts up in synchronization with a clock CK. The clear control circuit 140 monitors a value of the register 141 and, if a clear command S3 is received, resets a counted value CNT of the counter 142 by asserting a clear signal S5. The determining unit 144 compares the counted value CNT of the counter 142 to a threshold value OF corresponding to an overflow period $T_{OF}$ and, if the counted value CNT reaches the threshold value OF, asserts a reset signal S4.

Figure 4:
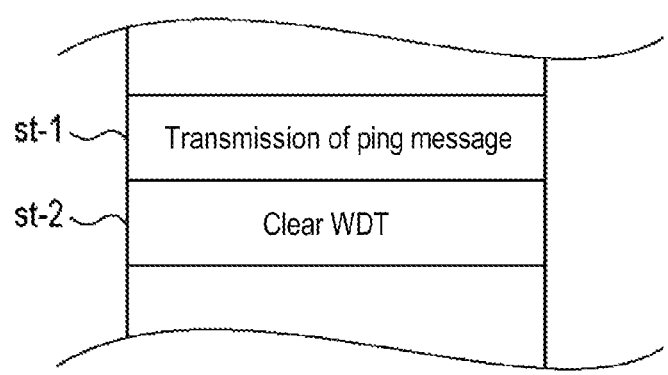
FIG. 4 is a diagram showing a portion of a program executed by a processor.

FIG. 4 is a diagram showing a portion of a program executed by the processor 124.

A first statement st_1 is a ping-related statement. When the processor 124 reads out this statement, the processor 124 instructs transmission of a ping message, by writing a designated control data S2, to a register that may be accessed by the interface circuit 122. The interface circuit 122 decodes the control data S2 written to the register and outputs a ping message to the power receiving device 20 via the bus line 4. Next, if the processor 124 reads out a second statement st_2, the processor 124 transmits a clear command S3 to the watchdog timer 128.

The description given above relates to a configuration of the power supply device 100. Next, operations of the power supply device 100 will be described below.

Figure 5A:
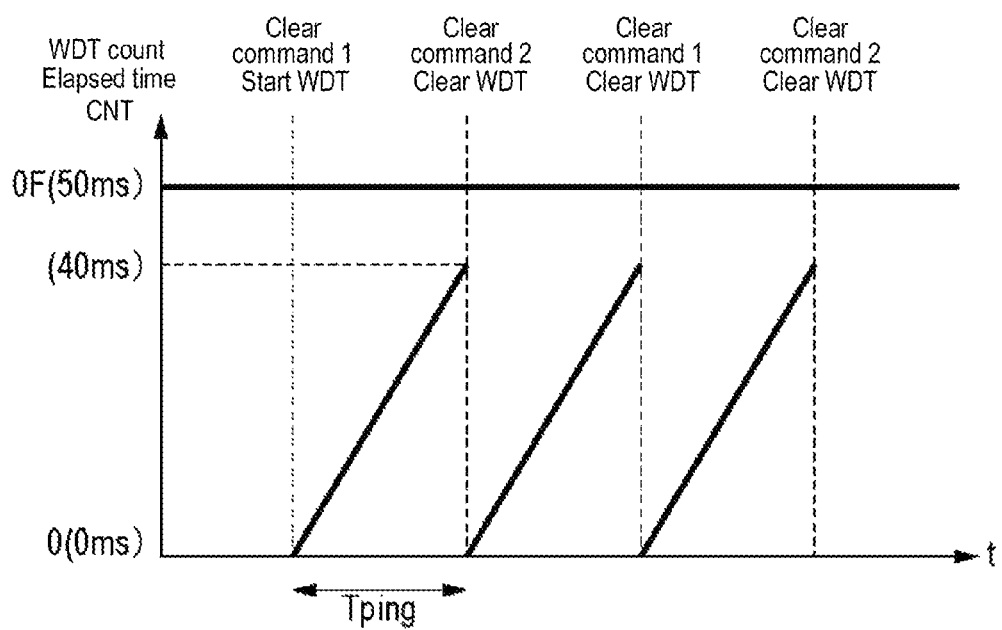

FIGS. 5A and 5B are operation waveform diagrams of the power supply device 100 of FIG. 2. FIG. 5A shows an operation in a normal state, whereas FIG. 5B is an operation in an abnormal state. The vertical axis is indicative of a counted value CNT of the counter 142 of the watchdog timer 128. As shown in FIG. 5A, while the processor 124 is normally operating, the counter 142 is reset at a period $T_{ping}$ of 40 ms. Thus, a counted value CNT of the counter 142 does not reach a threshold value corresponding to an overflow period $T_{OF}$ of 50 ms, and thus a reset signal S4 goes to a low level (negated).

As shown in FIG. 5B, if congestion occurs at the processor 124, ping-related statements (st_1 and st_2 of FIG. 4) are not executed in a ping period $T_{ping}$, and thus a clear command S3 is not transmitted to the watchdog timer 128. As a result, a counted value CNT reaches a threshold value OF, and thus a reset signal S4 is asserted (high level).

The description given above relates to operations of the power supply device 10.

In the power supply device 10, we focused on a ping message generated in the USB-PD specification every 40 ms. Since software processing of the processor 124 interrupts transmissions of the ping messages, an anomaly of the processor may be detected in a short period of time by resetting the watchdog timer 128 concurrently with the corresponding software processing (statement st_1 of FIG. 3). Thus, output of a high voltage or a high current for a long time period of a few seconds as in the conventional art can be prevented, thereby improving reliability of the system.

In conventional architecture, the processor 124 clears the watchdog timer 128 at a clear period of a few seconds and generates a ping message at a ping period $T_{ping}$ of 40 ms. In other words, it is necessary to manage both the clear period of a few seconds and the ping period of 40 ms on a program. On the other hand, according to the present embodiment, since only a ping period $T_{ping}$ needs to be managed, the overall control can be simplified.

Furthermore, even in conventional architecture, congestion of the processor 124 may technically be detected in a short period of time by reducing a clear period. However, in this case, it is necessary for the processor 124 to simultaneously manage a short clear period and a short ping period $T_{ping}$, which is separate from the clear period, in parallel, and thus a separate problem of increasing power consumed by the processor 124 happens. On the other hand, in the power supply device 10 according to the embodiment of the present disclosure, it is necessary to manage only a ping period $T_{ping}$, a problem of increasing power consumption does not occur.

Furthermore, according to the present embodiment, the processor 124 is configured to transmit a clear command S3 to the watchdog timer 128 every time the processor 124 instructs the interface circuit 122 to transmit a ping message. Since the configuration may be embodied by adding the ping-related statement st_1 related to transmission of a ping message and the statement st_2 for transmitting a clear command S3, to a program to be executed by the processor 124, increase of hardware resources may be suppressed.

Second Embodiment

In the first embodiment, the processor 124 transmits a clear command S3 to the watchdog timer 128. The configuration indicates that the statement st_2 for generating a clear command S3 is added to a program as shown in FIG. 4, and thus, a number of process cycles may increase. According to applications of the power supply device 10, an increase in the number of process cycles may not be preferable. According to a second embodiment of the present disclosure, an architecture for resetting the watchdog timer 128 without increasing a number of process cycles of a program executed by the processor 124 is employed.

FIG. 6 is a block diagram of a power supply device 10a according to the second embodiment. In FIG. 6, components identical to those shown in FIG. 2 are omitted.

A watchdog timer 128a is configured to monitor control data S2, which is transmitted from a processor 124 to an interface circuit 122 and is related to a command to transmit a ping message, and is configured to be cleared when the control data S2 satisfies a predetermined condition.

The interface circuit 122 includes a register 150, a decoder 152, and a modulator 154. The processor 124 instructs a transmission of a ping message by writing control data S2 to the register 150. The decoder 152 decodes the control data S2 written to the register 150 and outputs a modulated signal S1 corresponding to a ping message to the modulator 154.

The watchdog timer 128a includes a counter 142, a determining unit 144, and a clear control circuit 140a. The counter 142 and the determining unit 144 are identical to those shown in FIG. 3. When control data S2 input to the interface circuit 122 satisfies a predetermined condition (that is, when a ping message is transmitted to the interface circuit 122), the clear control circuit 140a asserts a clear signal S5 and resets the counter 142. For example, the clear control circuit 140a may monitor the register 150 of the interface circuit 122 and, when designated control data S2 is written to the register 150 in a predetermined order, may assert a clear signal S5.

The description given above relates to a configuration of the power supply device 10a according to the second embodiment.

According to the power supply device 10a, malfunction of the processor 124 may be detected in a short period of time, as in the first embodiment.

Furthermore, the transmission of control data S2 to the interface circuit 122 also serves as a clear command with respect to the watchdog timer 128a. In other words, since the statement st_2 for clearing the watchdog timer 128 in the program shown in FIG. 4 is not necessary, a number of cycles to be performed by the processor 124 can be reduced. Thus, capacity of the memory 126 may be reduced or power consumed by the processor 124 may be reduced.

Embodiments of the present disclosures have been described above. The embodiments are merely examples, and it will be understood by one of ordinary skill in the art that various modifications may be made therein based on combinations of components or processes according to the embodiments. Hereinafter, such modified embodiments will be described.

First Modified Embodiment

A power supply device 10 transmits messages other than a ping message, such as a GoodCRC message, an Accept message, a PS_RDY message, etc. While the messages are transmitted, a ping message is not transmitted, and thus a ping message transmission interval temporarily increases. If the transmission interval becomes longer than an overflow period $T_{OF}$, a processor 124 may be erroneously detected as malfunctioning. Therefore, the processor 124 may clear a watchdog timer 128 whenever commands related to transmission/reception of all messages including a ping message and other messages are executed.

Second Modified Embodiment

If a power receiving device 20 that does not comply with the USB-PD specification is connected to a power supply device 10, it is assumed that a processor 124 may not transmit a ping message. Therefore, if it is determined that the power receiving device 20 does not comply with the USB-PD specification, the processor 124 may transmit a clear command S3 to a watchdog timer 128 at a predetermined clear period $T_{CLR}$. In this case, the clear period $T_{CLR}$ may be 40 ms which is identical to a ping period $T_{ping}$.

(Applications)

Figure 7:
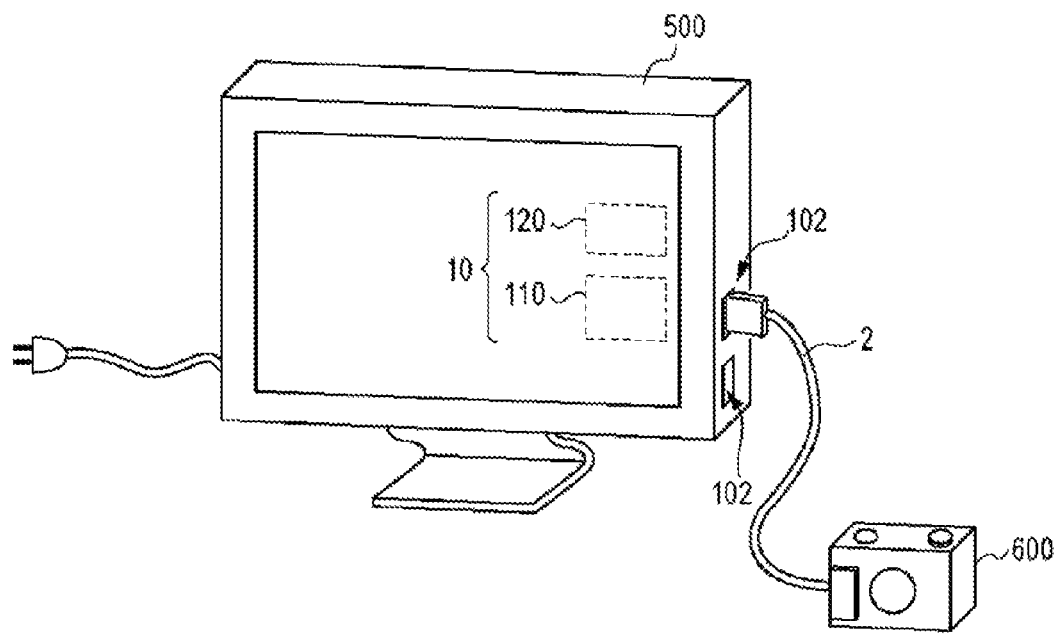
FIG. 7 is a diagram showing an electronic device including a power supply device according to one embodiment of the present disclosure.

Lastly, applications of a power supply device 10 will be described. FIG. 7 is a diagram showing an electronic device 500 including a power supply device 10 according to one embodiment of the present disclosure. For example, the electronic device 500 may be a TV, a display device, a desktop personal computer (PC), a laptop PC, etc. The electronic device 500 includes the power supply device 10 inside a casing of the electronic device 500. The power supply device 10 is connected to an electronic device 600 including a power receiving device 20, via a USB cable 2. The electronic device 600 may be a digital camera, a tablet PC, a smart phone, a laptop PC, etc.

According to an embodiment of the present disclosure, a malfunction of a processor may be detected in a short period of time.

While certain embodiments have been described, these embodiments have been presented by way of example only, and are not intended to limit the scope of the disclosures. Indeed, the novel methods and devices described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A controller, which is installed on a power supply device complying with the USB (Universal Serial Bus)-PD (power delivery) specification and controls a power supply circuit for supplying a bus voltage to a power receiving device via a bus line, the controller comprising:
   an interface circuit, which communicates with the power supply device via the bus line;
   a processor, which transmits and receives messages to and from the power receiving device by using the interface circuit, determines a voltage level of the bus voltage, and sets the determined voltage level to the power supply circuit; and
   a watchdog timer, which is cleared whenever the processor executes a ping-related statement for transmission or reception of ping messages to or from the power receiving device, wherein an overflow period of the watchdog timer is set to be longer than a period for the ping messages,
   wherein the processor transmits a clear command to the watchdog timer every time the processor instructs a transmission of a ping message to the interface circuit.

2. The controller of claim 1, wherein the watchdog timer comprises:
   a counter;
   a determining unit, which compares a counted value of the counter to a predetermined threshold value; and
   a clear control circuit, which receives the clear command generated by the processor and, resets the counter if the clear command is received.

3. The controller of claim 1, wherein a program executed by the processor comprises:
   a first statement for instructing a transmission of the ping messages to the interface circuit; and
   a second statement for generating a clear command for the watchdog timer.

4. The controller of claim 1, wherein the watchdog timer monitors control data related to a command for transmitting a ping message, which is transmitted from the processor to the interface circuit, and is cleared if the control data satisfies a predetermined condition.

5. The controller of claim 4, wherein the watchdog timer comprises:
   a counter;
   a determining unit, which compares a counted value of the counter to a designated threshold value; and
   a clear control circuit, which resets the counter if the processor monitors the control data transmitted to the interface circuit and the control data satisfies a predetermined condition.

6. The controller of claim 1, wherein, if the power receiving device does not comply with the USB-PD specification, the processor transmits a clear command to the watchdog timer at a predetermined period.

7. The controller of claim 1, wherein the controller is monolithically integrated on a single semiconductor substrate.

8. A power supply device comprising:
a power supply circuit, which is capable of outputting a first bus voltage with a first voltage level and a second bus voltage with a second voltage level higher than the first voltage level; and
the controller of claim 1, which controls the power supply circuit.

9. The power supply device of claim 8, further comprising:
a first switch, which is arranged on a path of the first bus voltage; and
a second switch, which is arranged on a path of the second bus voltage,
wherein the controller controls the first switch and the second switch as well as the power supply circuit.

10. An electronic device comprising the power supply device of claim 8.

11. A method of controlling a power supply device that complies with the USB (Universal Serial Bus)-PD (power delivery) specification, the method comprising:
setting an overflow period of a watchdog timer to be longer than a period for transmitting a ping message to a power receiving device;
transmitting and receiving messages between a processor and the power receiving device;
determining a voltage level of a bus voltage to be supplied to the power receiving device;
setting the determined voltage level to a power supply circuit; and
clearing the watchdog timer whenever the processor executes ping-related commands related to transmission and reception of ping messages to and from the power receiving device.

12. The method of claim 11, wherein the watchdog timer is cleared based on a clear command generated by the processor.

13. The method of claim 11, further comprising monitoring control data related to a command to transmit a ping message, which is transmitted from the processor to an interface circuit,
wherein the watchdog timer is cleared if the control data satisfies a predetermined condition.

* * * * *